United States Patent [19]

Rowton

[11] 4,239,856

[45] Dec. 16, 1980

[54] METHOD FOR PREPARING HIGH-RESILIENT FLEXIBLE URETHANE FOAMS

[75] Inventor: Richard L. Rowton, Austin, Tex.

[73] Assignee: Texaco Development Corp., White Plains, N.Y.

[21] Appl. No.: 937,303

[22] Filed: Aug. 28, 1978

[51] Int. Cl.³ .................. C08G 18/14; C08G 18/32
[52] U.S. Cl. ................................. 521/118; 521/159; 521/164; 521/904
[58] Field of Search ............... 521/118, 159, 164, 904

[56] References Cited

U.S. PATENT DOCUMENTS

| | | | |
|---|---|---|---|
| 3,394,164 | 7/1968 | McClellan et al. | 521/159 |
| 3,476,933 | 11/1969 | Mendelsohn | 521/160 |
| 3,933,701 | 1/1976 | Ping et al. | 521/904 |
| 4,119,582 | 10/1978 | Matsubara et al. | 521/904 |
| 4,150,206 | 4/1979 | Jourquin et al. | 521/51 |

FOREIGN PATENT DOCUMENTS 717124  8/1965  Canada .................................. 521/164

OTHER PUBLICATIONS

Webster's New World Dictionary, College Edition, World (N.Y.) 1964, p. 1576.
Wilson Follett, Modern American Usage, Hill & Wang (N.Y.) 1966, p. 334.
Buist–Developments in Polyurethane I, Applied Science Publishers Ltd. (London) p. 87 (no date).
Plastic Foams, Part 1, Frisch et al., Marcel Dekker (N.Y.) 1972, pp. 76-77, 80-81, 132-133.
Isonate 143L, Data Sheet of Upjohn Polymer Chemicals, LaPorte (Texas) 3 pp. (no date).

*Primary Examiner*—H. S. Cockeram
*Attorney, Agent, or Firm*—Carl G. Ries; Robert A. Kulason; Kenneth R. Priem

[57] ABSTRACT

A stable high-resilient (HR) flexible polyurethane foam may be made from an MDI type isocyanate, a polyether polyol and an amount of diethanolamine in an amount effective for preventing splits in the finished foam. The foams disclosed herein use water as the blowing agent. The disclosed foams have excellent properties and process without splitting.

2 Claims, No Drawings

METHOD FOR PREPARING HIGH-RESILIENT FLEXIBLE URETHANE FOAMS

BACKGROUND OF THE INVENTION

1. Field of the Invention

This invention pertains to the field of polyurethane polymers. More particularly, this invention relates to the field of MDI based flexible polyether polyurethane foam.

2. Description of the Prior Art

Polyurethane polymers such as polyurethane elastomers and foams are broadly produced by reacting an aromatic polyisocyanate with a polyol such as a polyester polyol or a polyether polyol in the presence of a catalyst. One useful class of organic polyisocyanates employed to form polyurethanes are diisocyanates. In some instances, the diphenylmethane diisocyanates (MDI-type isocyanates) have been found to be somewhat lacking in utility. For example, it has been found that when one employs a diphenylmethane diisocyanate to prepare one shot water blown flexible foams using a polyether polyol that the resultant foam tends to split badly. These types of foams are desirable since they are highly resilient (HR). It has been found that this splitting problem may be efficiently and economically solved by the method of this invention. Therefore, an object of this invention to provide a flexible, high resilient water blown polyurethane foam which maintains excellent properties and processes without splitting.

SUMMARY OF THE INVENTION

My invention is a high load bearing flexible polyurethane foam made from MDI type isocyanates containing water as the only blowing agent and an effective amount of diethanolamine. My invention includes the method of making these foams as well as the foam composition.

DESCRIPTION OF THE PREFERRED EMBODIMENTS

The diphenylmethane diisocyanate (MDI) is a known material which is obtained by phosgenation of diphenylmethane diamine. The latter, in turn, is obtained by interaction of formaldehyde, hydrochloric acid and primary aromatic amines, such as aniline, o-chloroaniline, or toluidine, and the like using procedures well-known in the art with respect to polyamine production. See, for example, U.S. Pat. Nos. 2,683,730; and 2,950,263; Canadian Pat. No. 700,026, and German specification No. 1,131,877.

Employed in conjunction with the above discussed diisocyanate is a polyol. These are known materials usually employed in making polyurethanes and a wide variety of varying polyols may be used here. Usually for flexible foams polyols have hydroxyl numbers ranging from about 25 to about 60. Such polyols generally have from about 2 to about 4 hydroxyl groups per molecule. Preferred polyols are polyether polyols. Acceptable polyether polyols are alkylene oxide adducts of a polyhydric alcohol with a functionality of from about 2 to about 4. Suitable polyhydric alcohols include, for example, glycerol, trimethylolpropane and 1,2,6-hexanetriol. The alkylene oxide may suitably be, for example, ethylene oxide, propylene oxide, or 1,2-butylene oxide, or a combination of some or all of these. The polyol will suitably have a hydroxyl number of from about 2000 to 7000.

The polyol component and the organic isocyanate component are mixed in the reaction mixture in such proportions that the ratio of isocyanato groups to hydroxyl groups, commonly known as isocyanate index, is from 0.95 to about 1.10 with an especially preferred isocyanate index being about 1.02. The ratio of isocyanato groups to hydroxyl groups includes also any water and diethanolamine that is present in the foamable reaction mixture.

In order to form the polyurethane foam, a catalyst useful in preparing foams of this type is employed in the usual manner. Such catalyst may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N'N'-tetramethyl-1,3-butanediamine, triethanolamine, 1,4-diazabicyclo[2.2.2]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyaldehyde, cyclopentanone-]-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as $Ti(OR)_4$, $Sn(OR)_4$, $Al(OR)_3$, and the like, wherein R is alkyl or aryl, and the reaction products of alcoholates with carboxylic acids, beta-diketones, and 2-(N,N-dialkylamino) alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi, and metal carbonyls or iron and cobalt.

Of course combinations of any of the above polyurethane catalysts may be employed. Usually the amount of catalyst employed ranges from about 0.01 to about 5.0 parts by weight percent based on 100 parts by weight of the polyol. More often the amount of catalyst used is 0.2 to 2.0 parts by weight.

Water is the only blowing agent useful in my invention. The amount of water used will vary with the density desired in the foamed product. In general, it may be stated that the density of the foam should vary from about 1.6 to 4.0 lbs. per cubic foot. The amount of water needed to achieve a desired density may be determined by one skilled in the art.

Other optional additives such as dispersing agents, cells stabilizers, surfactants, fillers, flame retardants, smoke depressants, and the like which are commonly employed in the fabrication of polyurethane foams can be employed in the process of the invention. Thus, a finer cell structure may be obtained if water-soluble organosilicone polymers are used as surfactants of the reaction mix. Organosilicone polymers obtained by condensing a polyalkoxy polysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene ether glycol may be used if desired to obtain better dispersion of the components of the foam mixture. These additives are used in amounts known to those skilled in the art.

Illustrative flame retardants are tris(haloalkyl)phosphates such as tris(2-chloroethyl)phosphate, tris(2-bromoethyl)phosphate, tris(2,3-dichloropropyl)phosphate, ammonium polyphosphates, sodium boarte, di(2-haloalkyl)-2-haloalkanephosphonates such as di(2-chloropropyl) 2-chloropropane phosphate, di(2-bromopropyl) 2-brompropane phosphonate, antimony oxides, polyvinyl chloride resins, dialkyl alkanephosphonates such as dimethyl benzylphosphonate, diamyl amylphosphonate, trimethyl phosphorothionate, ethylene phenyl phosphorothionate, tetrahalobisphenol such as tetrachlorobisphenol A, tetrabromobisphenol A and the like. Said flame retardants are employed in the compositions of the invention in the appropriate amounts necessary to impart the desired degree of flame retardancy to the resulting cellular polymer.

Suitable illustrative inert inorganic fillers are calcium carbonate, ammonium phosphate, polyammonium phosphate, calcium phosphate, ammonium sulfate, silica asbestos, glass, glass fiber, mica, carbon black, carbon fiber, wood flour, antimony oxides, etc. Illustrative organic fillers are the various polymers, copolymers, and terpolymers of vinyl chloride, vinyl acetate, acrylonitrile, acrylamide, styrene, ethylene, propylene, butadiene, divinyl benzene, and the like. Cellulose, starch and organic boron fiber can also be employed, if desired.

The use of halogen-containing fillers is particularly advantageous since the use of such materials imparts additional flame resistance to the produced resin whether foamed or cast.

These foams of this invention are useful, for example, in molded seating for commercial and farm vehicles and for furniture parts.

The diethanolamine additive is useful in amounts ranging from about 0.2 to 2.0 parts by weight based on one hundred parts by weight of the polyol.

EXPERIMENTAL

The accompanying table gives examples that illustrate the usefulness of this invention. Isonate 143L (an MDI type isocyanate modified to assume a liquid form) is the isocyanate used. Pure 4,4'-diphenylmethanediisocyanate (MDI) is a solid at ambient temperatures and is therefore not convenient to use in so-called "one-shot" foams. Many times MDI is converted into an isocyanate-terminated prepolymer by reaction with a polyol, which in turn is used to make a finished product. However, this is an extra step, and a one-shot process such as illustrated below is desired.

My foams are water-blown only. No fluorocarbon or methylene chloride was used for auxiliary blowing. They are designed to have high load-bearing properties.

Experimental method: A hand-mixed foam was prepared by mixing all ingredients except the isocyanate by means of a drill-press mixer for 10 sec. (two × the formulation, in grams) and then mixing in the isocyanate for 5 sec. The mixture was poured into a one-gal. round ice cream carton. Degassing time ("health bubbles") and foam height were noted, and the foam was then cured in an oven at 250° F. for 15 min. The cartons were sliced in half vertically and any shrinkage as well as internal splits were noted.

There are a number of techniques commonly used by those skilled in the urethane foam art to correct the problem of horizontal splits in foam buns. Besides mechanical factors, the three changes usually made are:
 (1) Change or increase the silicone surfactant.
 (2) Vary the amine catalyst.
 (3) Increase the tin catalyst.

These changes, and others, are considered in the examples cited.

The significance of each example given in the table will now be pointed out.

EXAMPLE 1

This is the standard for comparison in which a conventional HR foam polyol was used along with a conventional flexible foam catalyst, triethylenediamine, and a small amount of tin catalyst. No silicone was used. The foam did not collapse, but contained large horizontal splits.

EXAMPLE 2

Like Exp. 1, but a conventional HR surfactant, L-5303 was added. The foam was inferior to Example 1, collapsing back farther than the standard.

EXAMPLE 3

The relative degree of blowing was increased by the addition of THANCAT® DD catalyst. Again large horizontal splits occurred.

EXAMPLE 4

Another amine blowing catalyst, Niax® A-1, was included in the standard formulation, with the same results as in Example 3.

EXAMPLE 5

A large amount of THANCAT DD was the only catalyst. Again horizontal splits were obtained.

EXAMPLE 6

A different surfactant was tried—the versatile flexible foam silicone, Niax® L-520. The foam still split, but the splits were smaller and the foam held up better.

EXAMPLE 7-9

DC-200, a dimethylsiloxane, was used as the surfactant. Ordinarily, this material must be used at very low levels—e.g., 0.02 pbw—or the foam will be very tight (nonporous) and shrink. Here levels as high as 0.5 pbw were employed and the foams remained open—and split.

EXAMPLE 10

An increase in the tin catalyst level had little effect on the cell structure of the foam. Splitting occurred.

EXAMPLE 11

Another polyol commonly used for HR foams, Multranol 3901, offered no advantages over Thanol SF-5505.

EXAMPLE 12

An aminoalcohol, Diglycolamine, was employed as a "chain extender", but splits still appeared in the foam.

EXAMPLES 13 & 14

Surprisingly, diethylanolamine stabilized the foams perfectly: There was no undue tightness if the level or crosslinker was set properly (Example 14).

TABLE

| Example/Formulation Ingredients[1] | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Thanol® SF-5505[2] | 100 | 100 | 100 | 100 | 100 | 100 | 100 | 100 | 100 | 100 | — | 100 | 100 | 100 |
| Multranol® 3901[3] | — | — | — | — | — | — | — | — | — | — | 100 | — | — | — |
| Diethanolamine[4] | — | — | — | — | — | — | — | — | — | — | — | — | 1.0 | 0.5 |
| Diglycolamine®[5] | — | — | — | — | — | — | — | — | — | — | — | 1.0 | — | — |
| Water | 2.5 | 2.5 | 2.5 | 2.5 | 2.5 | 2.5 | 2.5 | 2.5 | 2.5 | 2.5 | 2.5 | 2.5 | 2.5 | 2.5 |
| Niax® L-5030[6] | — | 2.0 | — | — | — | 1.0 | — | — | — | — | — | — | — | — |
| Niax® L-520[7] | — | — | — | — | — | 1.0 | — | — | — | — | — | — | — | — |
| DC-200®[8] | — | — | — | — | — | — | 0.2 | 0.5 | 0.5 | 0.2 | — | — | — | — |
| Thancat® TD-33[9] | 1.0 | 1.0 | 0.4 | 0.4 | — | 1.0 | 1.0 | 1.0 | 0.5 | 0.5 | 0.2 | — | — | — |
| Thancat DD[10] | — | — | 0.1 | — | 1.0 | — | — | — | — | — | — | — | — | — |
| Niax® A-1[11] | — | — | — | 0.1 | — | — | — | — | — | — | — | — | — | — |
| T-12[12] | 0.02 | 0.02 | 0.02 | 0.02 | 0.2 | 0.2 | 0.2 | 0.2 | 0.2 | 0.05 | 0.0 | 0.2 | 0.2 | 0.2 |
| Isonate® 143L[13] | 49.1 | 49.1 | 49.1 | 49.1 | 49.1 | 49.1 | 49.1 | 49.1 | 49.1 | 49.1 | 47.1 | 51.9 | 53.3 | 50.5 |
| Index 1.02 | | | | | | | | | | | | | | |
| Time-to-Health bubbles, sec. | 55 | 87 | 72 | 54 | 40 | 45 | 45 | 40 | 68 | 60 | 54 | 42 | 50 | 35 |
| Foam ht., in | 6½ | 4½ | 4¼ | 4 | 6 | 7½ | 7 | 7½ | 6½ | 7 | 7½ | 8½ | 9 | 8 |
| Splits | large | large | large | large | large | small | small | small | small | small | large | small | none (tight) | none |

[1]Parts by weight
[2]Thanol SF-5505 polyol: a 5500-m.w. triol for HR molded foams, commercially available from Jefferson Chemical Co.
[3]Multranol 3901 polyol: a 6500-m.s. triol for HR molded foams, commercially available from Mobay Chemical Corp.
[4]Diethanolamine: bis(2-hydroxyethyl)amine
[5]Diglycolamine: Jefferson Chemical's trademark for 2-(2-aminoethoxy)ethanol
[6]Niax L-5303: A silicone cell control agent for HR molded foams supplied by Union Carbide Corp.
[7]Niax L-520: A silicone cell control agent for various types of foams supplied by Union Carbide Corp.
[8]DC-200: A silicone-containing surface active agent from Dow Corning Corp.
[9]Thancat TD-33: A 33% solution of triethylenediamine in propyleneglycol supplied by Jefferson Chemical Co.
[10]Thancat DD: 2-dimethylaminoethyl 3-dimethylaminopropyl ether
[11]Niax A-1: A 70% solution of bis(2-dimethylaminoethyl)ether
[12]T-12: Dibutyltin dilaurate
[13]Isonate 143L: A heat-modified methylenediphenyl diisocyanate made by the Upjohn Co.

I claim:

1. In a process of preventing splits in high-resilient, flexible polyurethane foam which is the reaction product of a polyether triol of about 5000 to 7000 molecular weight and a methylene diphenyl diisocyanate modified to assume a liquid form and in the presence of water as the only blowing agent, the improvement which comprises reacting the components in the presence of from about 0.2 to about 2.0 parts by weight of diethanolamine per 100 parts by weight of triol.

2. A process as in claim 1 wherein the polyether triol has a molecular weight of about 5500.

* * * * *